US011110789B2

(12) United States Patent
Pinschmidt et al.

(10) Patent No.: US 11,110,789 B2
(45) Date of Patent: Sep. 7, 2021

(54) DRIVE DEVICE FOR A VEHICLE AXLE OF A TWO-TRACK VEHICLE

(71) Applicant: AUDI AG, Ingolstadt (DE)

(72) Inventors: Udo Pinschmidt, Gaimersheim (DE);
Steffen Hummel, Bergen (DE);
Christian Wirth, Moosinning /
Eichenried (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/650,516

(22) PCT Filed: Oct. 18, 2018

(86) PCT No.: PCT/EP2018/078613
§ 371 (c)(1),
(2) Date: Mar. 25, 2020

(87) PCT Pub. No.: WO2019/091745
PCT Pub. Date: May 16, 2019

(65) Prior Publication Data
US 2020/0276897 A1 Sep. 3, 2020

(30) Foreign Application Priority Data
Nov. 13, 2017 (DE) ...................... 10 2017 220 166.5

(51) Int. Cl.
B60K 6/36 (2007.10)
B60K 6/365 (2007.10)
(Continued)

(52) U.S. Cl.
CPC ................ B60K 6/365 (2013.01); B60K 6/24 (2013.01); B60K 6/26 (2013.01); B60K 17/16 (2013.01);
(Continued)

(58) Field of Classification Search
CPC ............ B60K 6/365; B60K 6/24; F16H 3/663
See application file for complete search history.

(56) References Cited

U.S. PATENT DOCUMENTS 9,701,187 B2 * 7/2017 Smetana ................... B60K 6/48
10,030,755 B2 * 7/2018 Severinsson ............. B60K 6/48
(Continued)

FOREIGN PATENT DOCUMENTS

AT          513538 A1       5/2014
DE     102009049856 A1     4/2011
(Continued)

OTHER PUBLICATIONS

International Preliminary Report on Patentability and the Written Opinion of the International Searching Authority dated May 19, 2020, in connection with corresponding international Application No. PCT/EP2018/078613 (11 pgs).

(Continued)

Primary Examiner — Derek D Knight
(74) Attorney, Agent, or Firm — Maier & Maier, PLLC

(57) ABSTRACT

A drive device for a vehicle axle, in particular a rear axle, of a two-track vehicle, wherein the vehicle axle includes an axle differential, which is connectable on the input side to a primary drive machine and is connectable on the output side via flanged shafts arranged on both sides to vehicle wheels of the vehicle axle, wherein an additional drive machine and a shiftable superimposed transmission are associated with the vehicle axle, which transmission is shiftable into a torque distribution gear step, in which a drive torque generated by the additional drive machine is generated, in dependence on the dimension and rotational direction of which a torque distribution on the two vehicle wheels is changeable.

19 Claims, 4 Drawing Sheets

(51) Int. Cl.

| | | |
|---|---|---|
| *B60K 6/24* | (2007.10) | |
| *B60K 6/26* | (2007.10) | |
| *B60K 17/16* | (2006.01) | |
| *F16H 3/66* | (2006.01) | |
| *F16H 3/72* | (2006.01) | |
| *F16H 37/08* | (2006.01) | |

(52) U.S. Cl.
CPC ............ *F16H 3/663* (2013.01); *F16H 3/724* (2013.01); *F16H 37/0806* (2013.01); *F16H 2200/0021* (2013.01); *F16H 2200/201* (2013.01); *F16H 2200/2025* (2013.01); *F16H 2200/2041* (2013.01)

(56) References Cited

U.S. PATENT DOCUMENTS

| | | | | |
|---|---|---|---|---|
| 10,995,840 | B2* | 5/2021 | Pinschmidt | ............ B60K 6/48 |
| 2017/0227105 | A1* | 8/2017 | Pinschmidt | ............ B60K 6/365 |

FOREIGN PATENT DOCUMENTS

| | | |
|---|---|---|
| DE | 102010036239 A1 | 3/2012 |
| DE | 102012013375 A1 | 1/2014 |
| DE | 102013202381 A1 | 8/2014 |
| DE | 102013202382 A1 | 8/2014 |
| DE | 102013019906 A1 | 5/2015 |
| DE | 102013019907 A1 | 5/2015 |
| DE | 102014007940 A1 | 11/2015 |
| DE | 102014210549 A1 | 12/2015 |
| DE | 102014015793 A1 | 4/2016 |
| EP | 2775171 A1 | 9/2014 |

OTHER PUBLICATIONS

Examination Report dated Aug. 2, 2018 in corresponding German application No. 10 2017 220 166.5; 12 pages including Machine-generated English-language translation.

International Search Report dated Jan. 22, 2019 and Written Opinion in corresponding application No. PCT/EP2018/078613; 23 pages.

* cited by examiner

DRIVE DEVICE FOR A VEHICLE AXLE OF A TWO-TRACK VEHICLE

FIELD

The disclosure relates to a drive device for a vehicle axle, in particular a rear axle, of a two-track vehicle.

BACKGROUND

A generic drive device for a vehicle rear axle is known from DE 10 2014 015 793 A1, which comprises an axle differential connectable on the input side to a primary drive machine (for example, an internal combustion engine) and is connectable on the output side using flanged shafts arranged on both sides to vehicle wheels of the vehicle axle. The vehicle axle is associated with an additional drive machine (in particular an electric machine) and a shiftable superimposed transmission. The superimposed transmission can be shiftable into a torque distribution gear step, in which drive torque generated by the additional drive machine is generated, in dependence on the dimension and rotational direction of which a torque distribution onto the two vehicle wheels is changeable. Alternatively thereto, the superimposed transmission is shiftable into a hybrid mode, in which the drive torque generated by the additional drive machine can be coupled in a shiftable hybrid gear step via the axle differential uniformly distributed onto both flanged shafts of the vehicle wheels. In specific driving situations, for example, when cornering, the driving behavior can be assisted by a torque redistribution (torque vectoring or differential lock function) by engaged torque distribution gear step. Thus, when cornering, a drive torque can be displaced to the vehicle wheel on the outside of the curve at the entry to the curve (torque vectoring). Alternatively or additionally, when cornering, the drive torque can be displaced to the vehicle wheel on the inside of the curve (differential lock function) at the curve exit. In contrast, with activated hybrid mode, for example, a boost function can be performed.

In above DE 10 2014 015 793 A1, the superimposed transmission has a total of three planetary gear trains, which are shiftable via two brakes to provide the hybrid mode or the torque distribution mode, whereby a structural-space-intensive arrangement results overall.

SUMMARY

The object of the invention is to provide a drive device for a vehicle axle of a two-track vehicle which is constructed with reduced installation space in comparison to the prior art, and in which a function expansion/reduction is enabled using simple means, specifically with less installation space requirement and with enhanced vehicle dynamics.

According to the disclosure, the superimposed transmission comprises precisely two planetary gear trains, specifically an input planetary gear train, which is designed as a Ravigneaux gear set, and an output planetary gear train, which is designed as a simple planetary gear train gear set. The input planetary gear train is connected with respect to drive on the input side to the additional drive machine. The output planetary gear train comprises an input element which is connected to the input planetary gear train, while its output element is connected with respect to drive to the axle differential input side. In this manner, hybrid and/or torque distribution gear steps can be implemented in a simple manner With an engaged first hybrid gear step, which is preferably implemented as a starting gear, and with an engaged second hybrid gear step, which is preferably designed as a $CO_2$-optimized travel gear for higher travel speeds, a load path thus results in which the input planetary gear train and the output planetary gear train are incorporated without power splitting. In contrast, with the engaged torque distribution gear step, a load path results in which both the input and the output planetary gear trains are also incorporated, wherein power split-ting takes place at the input planetary gear train.

In one technical implementation, the two planetary gear trains and the axle differential can be arranged in series one after another coaxially to the flanged shaft. The input planetary gear train can be connected in a rotationally-fixed manner using its input element, in particular a first sun gear, to a transmission input shaft driven by the additional drive machine. In contrast, the output element of the output planetary gear train can be arranged in a rotationally-fixed manner via a hybrid pinion flange on a transmission output shaft, which is connected with respect to drive to the axle differential input side. The output element of the output planetary gear train can preferably be a planet gear carrier carrying planet gears. As a reaction element, the output planetary gear train can be a housing-fixed sun gear meshing with the planet gears. Its input element, in contrast, can be a ring gear, which meshes with the planet gears and is coupled with respect to drive to the input planetary gear train.

In one embodiment variant which is favorable for installation space, the ring gear of the output planetary gear train and a ring gear of the input planetary gear train can be jointly arranged in a rotationally-fixed manner on a ring gear shaft. The ring gear of the input planetary gear train designed as a Ravigneaux gear set can mesh with planet gears of a radial outer planet gear set. These in turn have a tooth mesh with both planet gears of a radial inner planet gear set and also to the above-mentioned first sun gear, which is connected via the transmission input shaft to the additional drive machine. The planet gears of the radial inner planet gear set, in contrast, mesh with a second sun gear, wherein the two planet gear sets are rotationally mounted on a common planet gear carrier.

The common planet gear carrier of the input planetary gear train can be brakeable via a first hybrid shift element SH1 on the transmission housing or can be releaseable therefrom. In the first hybrid gear step H1, the common planet gear carrier of the input planetary gear train is shifted in a housing-fixed manner by means of the first hybrid shift element SH1. A load path thus results from the additional drive machine via the first sun gear and via the planet gears of the radial outer planet gear set to the ring gear of the input planetary gear train and from there further via the ring gear shaft out of the output planetary gear train to the transmission output shaft, specifically without power splitting having correspondingly high efficiency, i.e., without greater power losses (reactive powers).

The additional drive machine can be coupled for torque conversion via a reduction gear step to the transmission input shaft, in particular to a single-step spur gear step. In this case, the additional drive machine can be positioned axially parallel to the flanged shaft.

The second sun gear can be brakeable via a second shift element SH2 on the transmission housing or can be releasable therefrom. In the second hybrid gear step H2, the second sun gear of the input planetary gear train is thus shifted in a housing-fixed manner by means of the second hybrid shift element SH2. A load path thus results from the additional drive machine via the first sun gear and via the planet gears of the radial outer planet gear set to the ring gear and from there further via the ring gear shaft and the output planetary gear train to the transmission output shaft. This load path also takes place without power splitting.

In one refinement, the transmission structure can comprise a torque distribution pinion shaft leading to the axle differential. This can bear a torque distribution flange in a rotationally-fixed manner, which can be coupled with respect to drive to the common planet gear carrier of the input planetary gear train or can be released therefrom via a torque distribution shift element STV.

The axle differential can be implemented in any desired construction. In one specific embodiment, the axle differential can also be designed as a Ravigneaux gear set, in which planet gears of a radial outer planet gear set mesh both with the radial outer ring gear, which forms the axle differential input side, and also with planet gears of a radial inner planet gear set and with a first sun gear. In contrast, the planet gears of the radial inner planet gear set mesh with a second sun gear. The two planet gear sets are rotationally mounted on a common planet gear carrier. It is preferable if the first sun gear is arranged in a rotationally-fixed manner on the torque distribution pinion shaft. In contrast, the second sun gear can be arranged in a rotationally-fixed manner on the one flanged shaft, while the common planet gear carrier can be arranged in a rotationally-fixed manner on the other flanged shaft.

With engaged torque distribution gear step TV, in the above-described transmission structure, the torque distribution pinion shaft and the common planet gear carrier of the input planetary gear train are connected to one another with respect to drive. A load path thus results from the additional drive machine into the input planetary gear train. A power distribution takes place on its common planet gear carrier, in which a first partial path leads via the ring gear of the input planetary gear train and via the ring gear shaft to the output planetary gear train. From there, the first partial path leads further via the planet gear carrier of the output planetary gear train to the transmission output shaft. A second partial path leads via the planet gear carrier of the input planetary gear train and the closed torque distribution shift element to the torque distribution pinion shaft and from there to the first sun gear of the axle differential.

With regard to a package optimization, the following arrangement of the transmission components is preferred: Thus, viewed in the vehicle transverse direction from the vehicle inside to the vehicle outside, the axle differential, the output planetary gear train, the input planetary gear train, and the additional drive machine can be arranged in a series one after another. The two hybrid shift elements SH1, SH2 can be positioned between the vehicle-outer input planetary gear train and the additional drive machine. In contrast thereto, the torque distribution shift element STV can be positionable between the input and the output planetary gear trains and can be implemented as a clutch. In contrast, the hybrid shift elements SH1, SH2 are implemented with simple components as brakes.

An exemplary embodiment of the invention is described hereafter on the basis of the appended figures.

DETAILED DESCRIPTION

Figure 1:
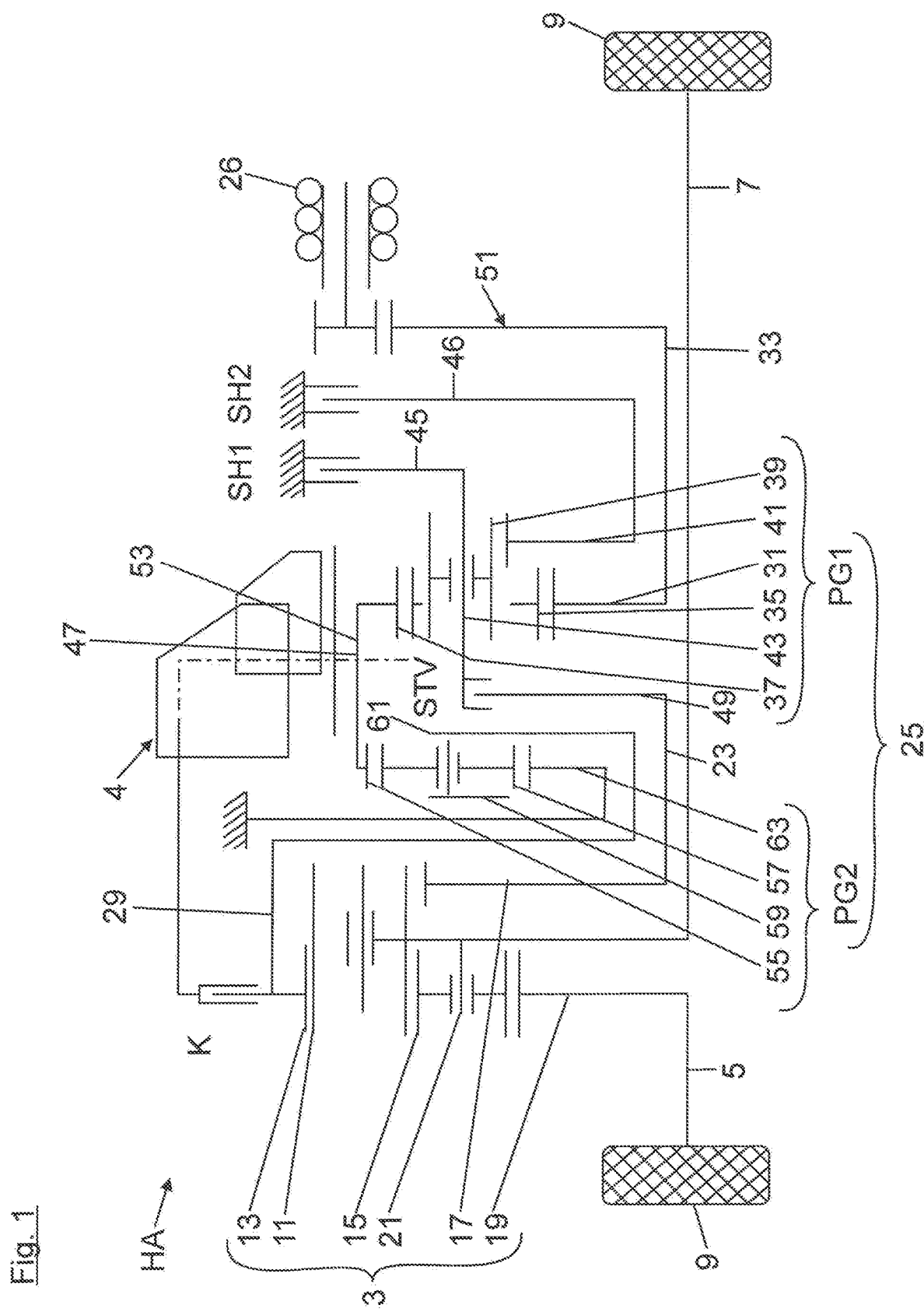
FIG. 1 shows a schematic illustration of a drive device for a vehicle rear axle of a two-track vehicle.

A transmission structure of a drive device for a vehicle rear axle HA of a two-track vehicle is shown very schematically in FIG. 1. The drive device indicated in FIG. 1 can be part of an all-wheel-drive, in which a frontal internal combustion engine (not shown), as a primary drive machine, outputs to the front wheels of the vehicle via a transmission and a center differential and a front axle differential. The center differential can be connected with respect to drive via a Cardan shaft and via a bevel gear 4 to the input side 13 of a rear axle differential 3. A clutch K, by means of which the rear axle HA can be decoupled with respect to drive from the Cardan shaft, is connected between the bevel gear 4 and the input side 13 of the rear axle differential 3.

The rear axle differential 3 is coupled with respect to drive on the output side via flanged shafts 5, 7 arranged on both sides to the vehicle rear wheels 9 of the vehicle rear axle HA. In FIG. 1, the rear axle differential 3 is a planetary differential having a Ravigneaux gear set, in which planet gears 11 of a radial outer planet gear set mesh both with a radial outer ring gear 13, which forms the input side of the axle differential 3, and also with planet gears 15 of a radial inner planet gear set. Moreover, the planet gears 11 of the radial outer planet gear set have a tooth mesh with a first, large sun gear 17. The planet gears 15 of the second planet gear set, in contrast, have a tooth mesh with a second, small sun gear 19. Both planet gear sets are rotationally mounted on a common planet gear carrier 21, which is seated in a rotationally-fixed manner on a transmission-side flanged shaft 7. In contrast, the second, small sun gear 19 is seated in a rotationally-fixed manner on the transmission-remote flanged shaft 5, while the first, large sun gear 17 is seated in a rotationally-fixed manner on a torque distribution pinion shaft 23, which leads into the superimposed transmission 25.

The rear axle HA comprises the above-mentioned superimposed transmission 25 and an electric machine 26. The superimposed transmission 25 is operable in a hybrid mode or in a torque distribution mode (i.e., electronic torque vectoring or differential lock function), as described hereafter. In the hybrid mode, a drive torque generated by the electric machine 26 is coupled uniformly distributed onto the two flanged shafts 5, 7 via the superimposed transmission 25 and via the rear axle differential 3. The hybrid mode can be carried out solely by electric motor or in combination of the electric machine 26 with the internal combustion engine (for example, for a boost function).

In the torque distribution mode, the drive torque generated by the electric machine 26 is conducted not only to the input side (ring gear 13) of the axle differential 3, but rather also via the superimposed transmission 25 to the first large sun gear 17 of the axle differential 3, to change a torque distribution on the two rear wheels 9. The introduction into the first, large sun gear 17 takes place via a torque distribution flange 24 of the superimposed transmission 25 seated on the torque distribution pinion shaft 23. The torque distribution between the vehicle wheels 9 takes place in dependence on the amount and the rotational direction of the drive torque generated by the electric machine 26.

The transmission structure of the superimposed transmission 25 is explained hereafter on the basis of FIG. 1: accordingly, the superimposed transmission 25 comprises precisely two planetary gear trains PG1, PG2, of which the input planetary gear train PG1 is designed as a Ravigneaux gear set, which is connected on the input side to the electric machine 26. In contrast, the output planetary gear train PG2 is designed as a simple planetary gear train gear set, which is connected with respect to drive on the output side via a transmission output shaft 29 to the axle differential input side 13. The axle differential 3 and the two planetary gear trains PG1, PG2 are arranged in series one after another coaxially in relation to the flanged shaft 7. The input element of the input planetary gear train PG1 is implemented by a first sun gear 31, which is seated in a rotationally-fixed manner on a transmission input shaft 33, which is coupled via a reduction gear step 51 to the electric machine 26. Moreover, the input planetary gear train PG1 designed as a Ravigneaux gear set comprises planet gears 35 of a radial outer planet gear set, which mesh both with a radial outer ring gear 37 and also with planet gears 39 of a radial inner planet gear set. The planet gears 39 of the radial inner planet gear set moreover mesh with a second sun gear 41. The two planet gear sets are rotationally mounted on a common planet gear carrier 43. A first braking flange 45, which can be lock-braked via a first hybrid shift element SH1 on the transmission housing or can be released therefrom, is seated in a rotationally-fixed manner on the common planet gear carrier 43. On the axially opposing side, the common planet gear carrier 43 is extended with an axial web 47, on which a torque distribution shift element STV is seated, which can be coupled with the torque distribution flange 49 or can be released therefrom. The torque distribution flange is supported in a rotationally-fixed manner by the torque distribution pinion shaft 23, which is attached at its other shaft end to the first sun gear 17 of the axle differential 3.

The ring gear 37 of the input planetary gear train PG1 is arranged rotationally-fixed on a ring gear shaft 53 together with a ring gear 55 of the output planetary gear train PG2. The ring gear 55 of the output planetary gear train PG2 meshes with planet gears 57, which are rotatably mounted on a planet gear carrier 59. The planet gear carrier 59 is arranged in a rotationally-fixed manner via a hybrid pinion flange 61 on the transmission output shaft 29, which is connected with respect to drive to the axle differential input side 13. As a reaction element, the output planetary gear train PG2 comprises a housing-fixed sun gear 63 meshing with the planet gears 57.

Figure 2:
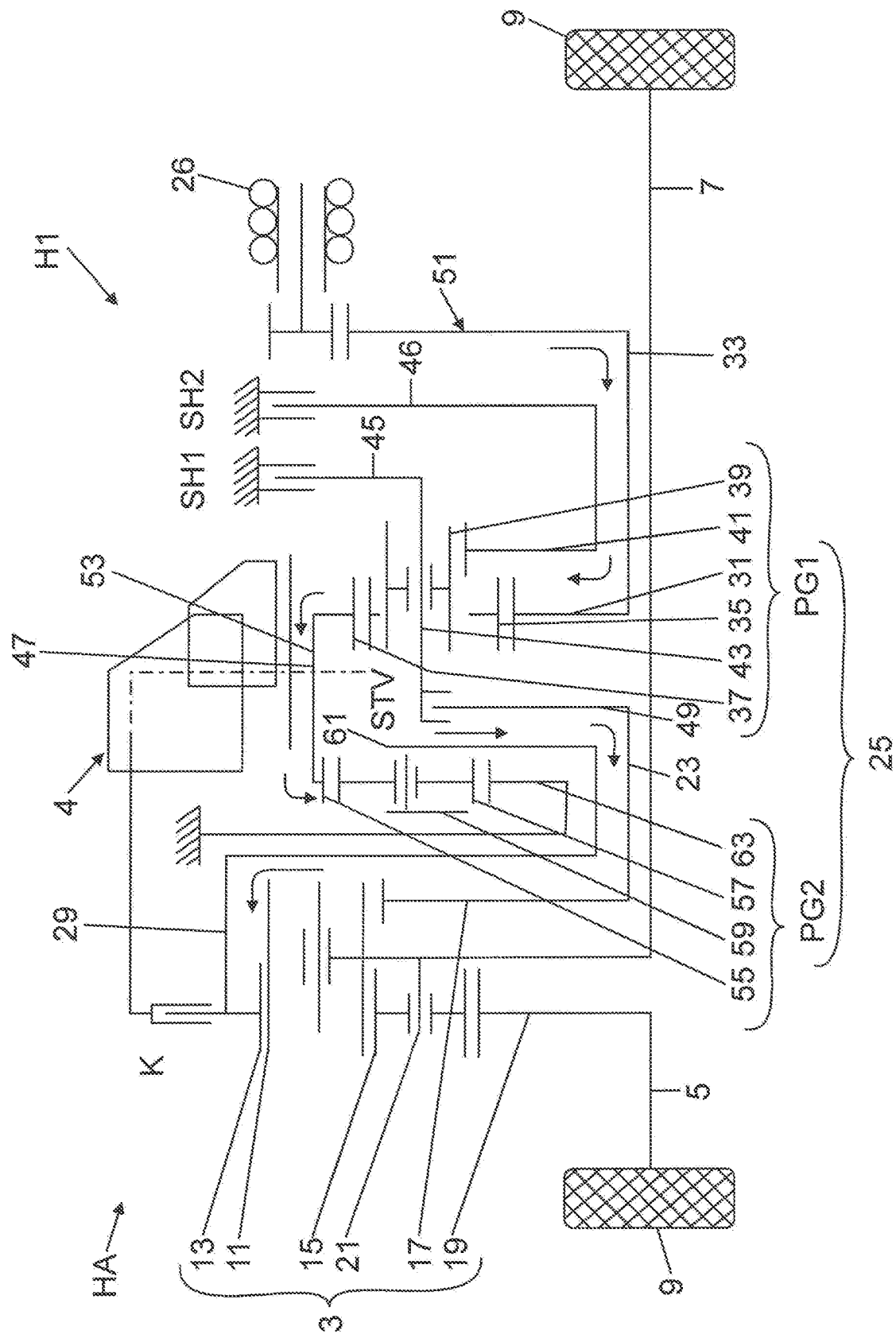
FIG. 2 show view corresponding to FIG. 1 having highlighted drive torque flow with engaged first hybrid gear step.

To explain the functionality of the drive device, a driving situation is described on the basis of FIG. 2, in which the first hybrid gear step H1 is engaged. In the present case, the first hybrid gear step H1 is designed by way of example as a starting gear, which can be engaged at low vehicle velocities. With engaged first hybrid gear step H1, the common planet gear carrier 43 of the input planetary gear train PG1 is shifted in a housing-fixed manner via the first hybrid shift element SH1. A load path from the electric machine 26 via the first sun gear 31 and via the planet gears 35 of the radial outer planet gear set to the ring gear 37 thus results. From there, the load path leads further via the ring gear shaft 53 to the output planetary gear train PG2. From its planet carrier 59, the load path leads via the hybrid pinion flange 61 up to the transmission output shaft 29.

Figure 3:
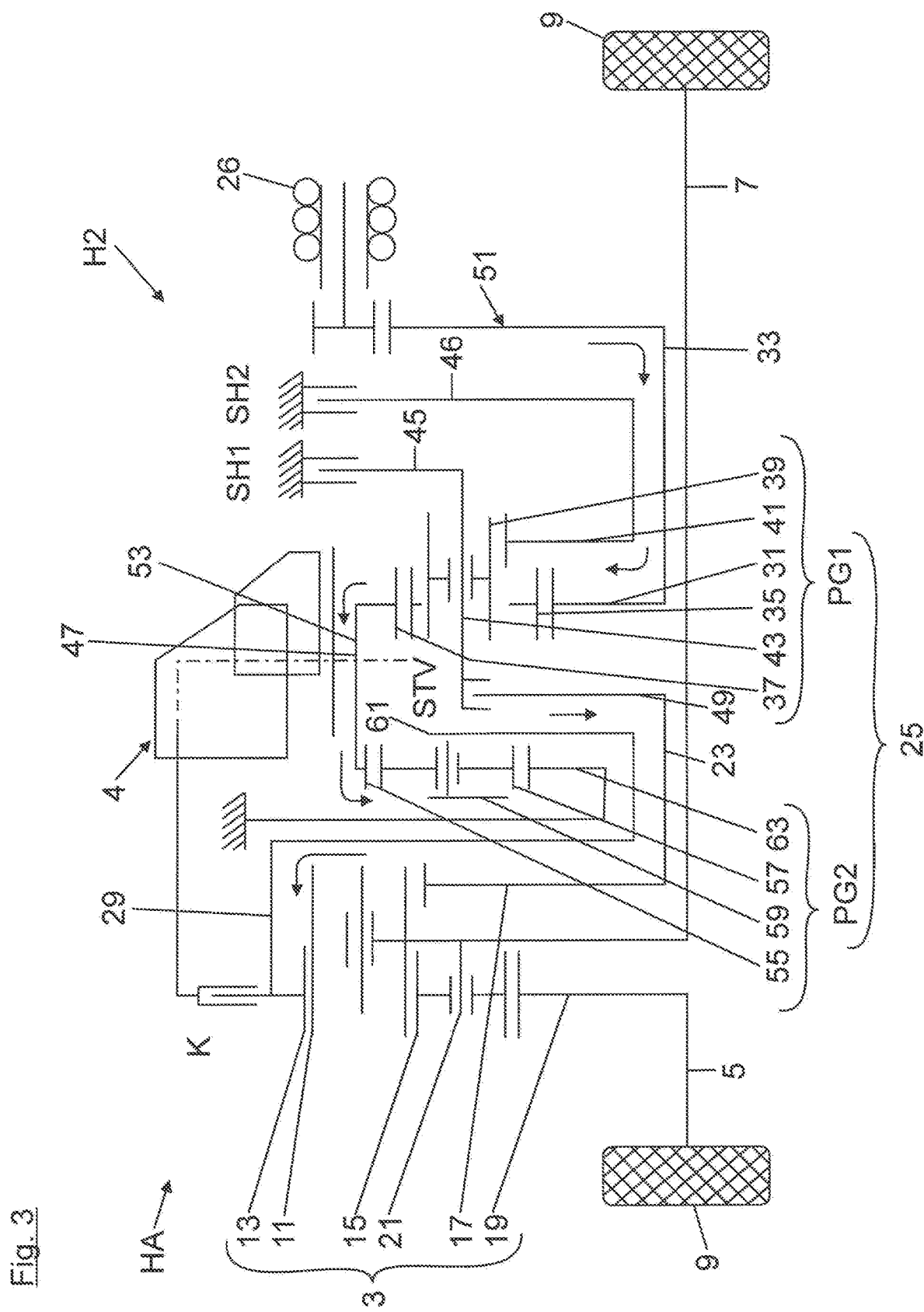
FIG. 3 show view corresponding to FIG. 1 having highlighted drive torque flow with engaged second hybrid gear step.

A further driving situation is shown in FIG. 3, in which the superimposed transmission 25 is operated with engaged second hybrid gear step H2. In this case, a braking flange 46 of the second sun gear 41 is lock-braked via the second hybrid shift element SH2 on the transmission housing. A load path thus results from the electric machine 26 via the first sun gear 31 and via the planet gears 35 of the radial outer planet gear set to the ring gear 37. From there, the load path leads further via the ring gear shaft 53 and the output planetary gear train PG2 up to the transmission output shaft 29.

Figure 4:
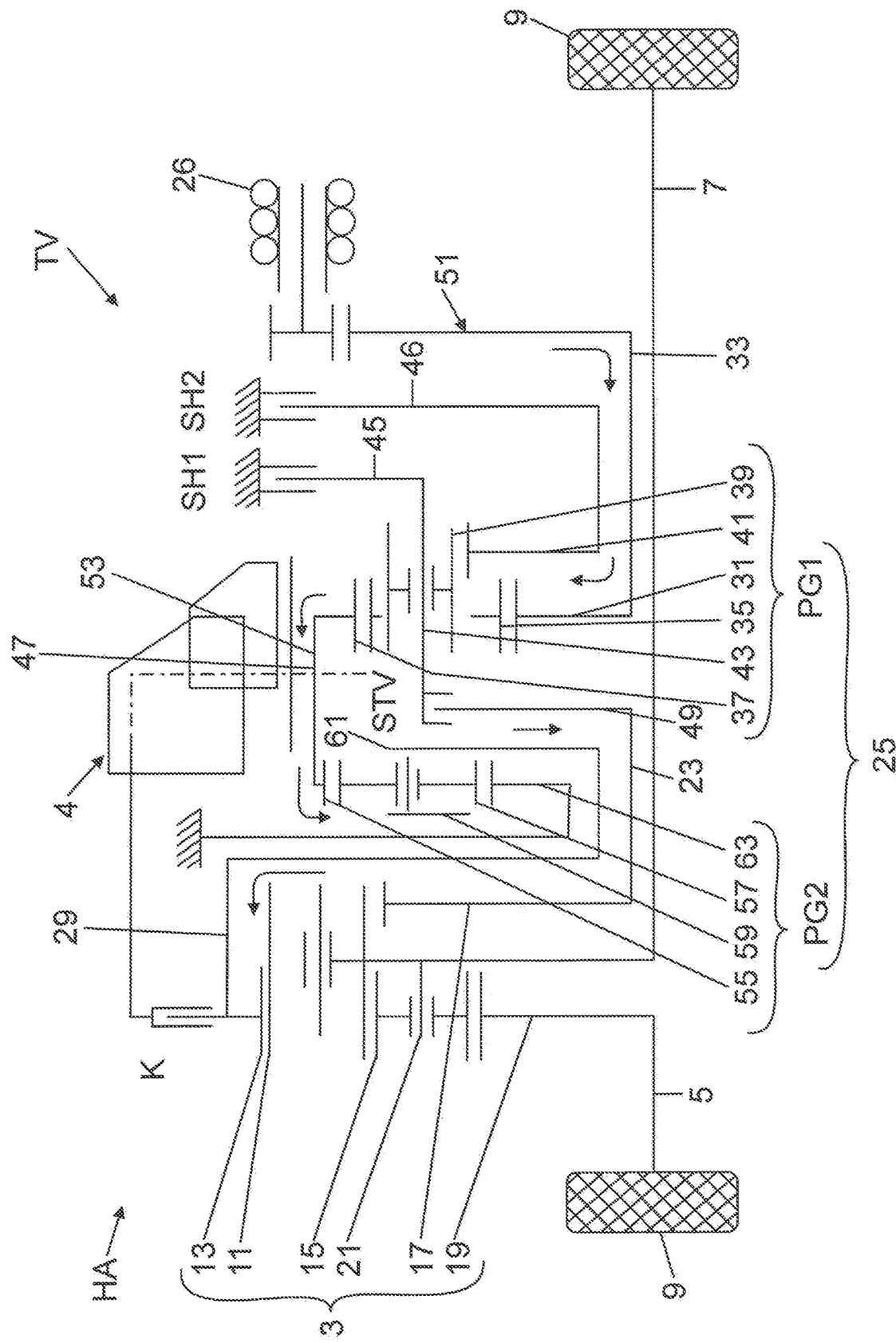
FIG. 4 show view corresponding to FIG. 1 having highlighted drive torque flow with engaged torque distribution gear step.

In FIG. 4, the superimposed transmission 25 is operated in a torque distribution mode. This mode is activated, for example, when cornering to achieve a torque difference between the flanged shafts 5, 7. In the torque distribution mode, the torque distribution gear step TV is engaged, so that the torque distribution pinion shaft 23 is connected with respect to drive by means of the torque distribution shift element STV to the common planet gear carrier 43 of the input planetary gear train PG1. A load path is thus formed from the electric machine 26 into the input planetary gear train PG1, at the common planet gear carrier 43 of which a power distribution takes place into a first partial path and a second partial path. The first partial path leads from the planet gears 35 of the radial outer planet gear set via the ring gear 37 and via the ring gear shaft 53 up to the output planetary gear train PG2. From there, the first partial path leads via the planet gear carrier 59 of the output planetary gear train PG2 further to the transmission output shaft 29. A second partial path leads from the common planet gear carrier 43 of the input planetary gear train PG1 via the closed torque distribution shift element STV to the torque distribution pinion shaft 23 and from there to the first axle differential sun gear 17.

The invention claimed is:

1. A drive device for a vehicle axle, wherein the vehicle axle comprises:
    an axle differential, which is connectable on a differential input side to a primary drive machine and is connectable on a differential output side to vehicle wheels of the vehicle axle via flanged shafts arranged on both sides of the axle differential,
    wherein an additional drive machine and a shiftable superimposed transmission are associated with the vehicle axle,
    wherein the superimposed transmission is shiftable into a torque distribution gear mode and a hybrid gear mode,
    wherein, in the torque distribution gear mode, a torque distribution of the vehicle wheels of the vehicle axle is changeable based on a magnitude and rotational direction of a drive torque generated by the additional drive machine,
    wherein, in the hybrid gear mode, torque generated by the additional drive machine is distributed uniformly among the vehicle wheels of the vehicle axle,
    wherein the superimposed transmission comprises precisely two planetary gear trains, an input planetary gear train and an output planetary gear train, which are connectable on a superimposing input side to the additional drive machine,
    wherein the input planetary gear train is designed as a Ravigneaux gear set and the output planetary gear train is designed as a simple planetary gear train gear set,
    wherein the output planetary gear train has precisely one input element, a reaction element, and an output element, of which the input element is connected to the input planetary gear train and the output element is connected to the differential input side, wherein the hybrid gear mode comprises a first hybrid gear step and a second hybrid gear step, wherein, in both the hybrid gear mode and the torque distribution gear mode, a load path is formed through the input planetary gear train and the output planetary gear train.

2. The drive device as claimed in claim 1, wherein, in the hybrid gear mode, the input planetary gear train and the output planetary gear train are incorporated without power splitting, and wherein, in the torque distribution gear mode, the input planetary gear train and the output planetary gear train are incorporated with power splitting occurring at the input planetary gear train.

3. The drive device as claimed in claim 1, wherein the two planetary gear trains and the axle differential are arranged in series one after another coaxially to the flanged shaft, wherein a first sun gear of the input planetary gear train is connected in a rotationally-fixed manner to a transmission input shaft driven by the additional drive machine, and wherein the output element of the output planetary gear train is a planet gear carrier bearing planet gears and is arranged in a rotationally-fixed manner via a pinion flange on a transmission output shaft connected to the differential input side.

4. The drive device as claimed in claim 3, wherein the reaction element of the output planetary gear train is a housing-fixed sun gear meshing with the planet gears, and wherein the input element of the output planetary gear train is a ring gear which meshes with the planet gears and is coupled to the input planetary gear train.

5. The drive device as claimed in claim 4, wherein the ring gear of the output planetary gear train and a second ring gear of the input planetary gear train are jointly arranged in a rotationally-fixed manner on a ring gear shaft.

6. The drive device as claimed in claim 1, wherein, in the input planetary gear train, outer planet gears of a radial outer planet gear set mesh with a radial outer ring gear, with inner planet gears of a radial inner planet gear set, and with the first sun gear, and wherein the inner planet gears of the radial inner planet gear set mesh with a second sun gear and the outer and inner planet gears are rotationally mounted on a common planet gear carrier.

7. The drive device as claimed in claim 6, wherein the common planet gear carrier of the input planetary gear train can be lock-braked on the transmission housing or can be released therefrom via a first hybrid shift element, wherein, in the first hybrid gear step, the common planet gear carrier of the input planetary gear train is shifted in a housing-fixed manner via the first hybrid shift element, such that the load path traverses the first sun gear, the outer planet gears of the radial outer planet gear set, the radial outer ring gear, the ring gear shaft, and the output planetary gear train to the transmission output shaft.

8. The drive device as claimed in claim 6, wherein the second sun gear can be lock-braked on the transmission housing via a second hybrid shift element, wherein, in the second hybrid gear step, the second sun gear of the input planetary gear train is shifted in a housing-fixed manner via the second hybrid shift element, such that the load path traverses the first sun gear, the outer planet gears of the radial outer planet gear set, the radial outer ring gear, the ring gear shaft, and the output planetary gear train to the transmission output shaft.

9. The drive device as claimed in claim 8, wherein a torque distribution pinion shaft leading to the axle differential bears a torque distribution flange in a rotationally-fixed manner, which can be coupled via a torque distribution shift element to the common planet gear carrier of the input planetary gear train or can be decoupled therefrom.

10. The drive device as claimed in claim 9, wherein the axle differential is designed as a second Ravigneaux gear set, in which outer differential planet gears of a radial outer differential planet gear set mesh with a radial outer differential ring gear, which forms the input side of the axle differential, with inner differential planet gears of a radial inner differential planet gear set, and with a first differential sun gear, wherein the inner differential planet gears of the radial inner differential planet gear set mesh with a second differential sun gear, wherein the inner and outer differential planet gears are rotationally mounted on a common differential planet gear carrier, and wherein the first differential sun gear is arranged in a rotationally-fixed manner on the torque distribution pinion shaft, the second differential sun gear is arranged in a rotationally-fixed manner on a first of the flanged shafts, and the common differential planet gear carrier is arranged in a rotationally-fixed manner on a second of the flanged shafts.

11. The drive device as claimed in claim 9, wherein, in the torque distribution gear mode, the torque distribution shaft and the common planet gear carrier of the input planetary gear train are connected via the torque distribution shift element, such that the load path traverses the input planetary gear train and a power distribution takes place on the common planet gear carrier of the input planetary gear train, wherein, in the power distribution, a first partial load path traverses the radial outer ring gear of the input planetary gear train, the ring gear shaft, and the planet gear carrier of the output planetary gear train to the transmission output shaft, and wherein, in the power distribution, a second partial load path traverses the common planet gear carrier of the input planetary gear train, the closed torque distribution shift element, and the torque distribution shaft to the first differential sun gear of the axle differential.

12. The drive device as claimed in claim 1, wherein the additional drive machine for torque conversion is coupled via a reduction gear step to the transmission input shaft, and/or wherein the additional drive machine is arranged axially-parallel to the flanged shaft.

13. The drive device as claimed in claim 1, wherein, observed in a vehicle transverse direction from a vehicle inside to a vehicle outside in a series one after another, the axle differential, the output planetary gear train, the input planetary gear train, and the additional drive machine are arranged, wherein the hybrid shift elements are positioned, in an axial direction, between the input planetary gear train and the additional drive machine, and/or wherein the torque distribution shift element is positioned between the input and output planetary gear trains.

14. The drive device as claimed in claim 2, wherein the two planetary gear trains and the axle differential are arranged in series one after another coaxially to the flanged shaft,
   wherein a first sun gear of the input planetary gear train is connected in a rotationally-fixed manner to a transmission input shaft driven by the additional drive machine, and
   wherein the output element of the output planetary gear train is a planet gear carrier bearing planet gears and is arranged in a rotationally-fixed manner via a pinion flange on a transmission output shaft connected to drive to the differential input side.

15. The drive device as claimed in claim 2, wherein, in the input planetary gear train, outer planet gears of a radial outer planet gear set mesh with a radial outer ring gear, with inner planet gears of a radial inner planet gear set, and with the first sun gear, and
   wherein the inner planet gears of the radial inner planet gear set mesh with a second sun gear and the outer and inner planet gears are rotationally mounted on a common planet gear carrier.

16. The drive device as claimed in claim 3, wherein, in the input planetary gear train, outer planet gears of a radial outer planet gear set mesh with a radial outer ring gear, with inner planet gears of a radial inner planet gear set, and with the first sun gear, and
   wherein the inner planet gears of the radial inner planet gear set mesh with a second sun gear and the outer and inner planet gears are rotationally mounted on a common planet gear carrier.

17. The drive device as claimed in claim 4, wherein, in the input planetary gear train, outer planet gears of a radial outer planet gear set mesh with a radial outer ring gear, with inner planet gears of a radial inner planet gear set, and with the first sun gear, and
   wherein the inner planet gears of the radial inner planet gear set mesh with a second sun gear and the outer and inner planet gears are rotationally mounted on a common planet gear carrier.

18. The drive device as claimed in claim 5, wherein, in the input planetary gear train, outer planet gears of a radial outer planet gear set mesh with a radial outer ring gear, with inner planet gears of a radial inner planet gear set, and with the first sun gear, and
   wherein the inner planet gears of the radial inner planet gear set mesh with a second sun gear and the outer and inner planet gears are rotationally mounted on a common planet gear carrier.

19. The drive device as claimed in claim 7, wherein the second sun gear can be lock-braked on the transmission housing via a second hybrid shift element,
   wherein, in the second hybrid gear step, the second sun gear of the input planetary gear train is shifted in a housing-fixed manner via the second hybrid shift element, such that the load path traverses the first sun gear, the outer planet gears of the radial outer planet gear set, the radial outer ring gear, the ring gear shaft, and the output planetary gear train to the transmission output shaft.

* * * * *